United States Patent
Zarpas (10) Patent No.: US 9,378,306 B2
(45) Date of Patent: Jun. 28, 2016

(54) BINNING VISUAL DEFINITION FOR VISUAL INTELLIGENCE

(71) Applicant: Business Objects Software Ltd., Dublin (IE)

(72) Inventor: Emmanuel Zarpas, Paris (FR)

(73) Assignee: Business Objects Software Ltd., Dublin (IE)

( * ) Notice: Subject to any disclaimer, the term of this patent is extended or adjusted under 35 U.S.C. 154(b) by 460 days.

(21) Appl. No.: 13/796,782

(22) Filed: Mar. 12, 2013

(65) Prior Publication Data

US 2014/0282160 A1    Sep. 18, 2014

(51) Int. Cl.
*G06F 3/0484*    (2013.01)
*G06F 17/30*    (2006.01)

(52) U.S. Cl.
CPC ................................ *G06F 17/30991* (2013.01)

(58) Field of Classification Search
CPC ......... G06F 3/00; G06F 3/048; G06F 3/0481; G06F 3/0482; G06F 3/0484; G06F 3/0486; G06F 17/30864; G06F 17/2247; G06F 17/30286; G06F 17/30991; H04L 29/08072
See application file for complete search history.

(56) References Cited

U.S. PATENT DOCUMENTS

| | | | | |
|---|---|---|---|---|
| 4,989,610 A * | 2/1991 | Patton | ................. | A61B 5/04365 600/508 |
| 8,806,321 B2 * | 8/2014 | Helfman | ....................... | 715/215 |
| 2002/0156806 A1 * | 10/2002 | Cox et al. | .................... | 707/501.1 |
| 2004/0103013 A1 * | 5/2004 | Jameson | ............... | G06Q 10/063 705/7.28 |
| 2006/0036639 A1 * | 2/2006 | Bauerle et al. | ................ | 707/102 |
| 2008/0180382 A1 * | 7/2008 | Hao | ........................ | G06Q 40/02 345/100 |
| 2009/0002370 A1 * | 1/2009 | Helfman | ................. | G06T 5/009 345/440 |
| 2010/0070904 A1 * | 3/2010 | Zigon et al. | .................... | 715/771 |
| 2010/0262901 A1 * | 10/2010 | DiSalvo | ......................... | 715/227 |
| 2012/0137238 A1 * | 5/2012 | Abeln | ................. | G06F 3/04847 715/771 |
| 2012/0144325 A1 * | 6/2012 | Mital | ..................... | G06F 9/4446 715/763 |
| 2012/0323829 A1 * | 12/2012 | Stokes et al. | ..................... | 706/12 |
| 2013/0019196 A1 * | 1/2013 | Bhatt | ............................ | 715/771 |

* cited by examiner

*Primary Examiner* — Xiomar L Bautista
(74) *Attorney, Agent, or Firm* — Fish & Richardson P.C.

(57) ABSTRACT

Methods, systems, and computer-readable storage media for receiving data, displaying the data visualization based on the data, the data visualization being displayed within a GUI and being provided as a histogram including a first plurality of bins, the first plurality of bins being defined based on default binning parameters, receiving user input, the user input being input to the data visualization using the GUI and indicating a first operation, providing user-defined binning based on the user input, and displaying a modified data visualization based on the data and the first operation, the modified data visualization being displayed within the GUI and being provided as a histogram including a second plurality of bins, the second plurality of bins being defined based on the user-defined binning parameters and being different from the first plurality of bins.

20 Claims, 7 Drawing Sheets

BINNING VISUAL DEFINITION FOR VISUAL INTELLIGENCE

BACKGROUND

Analyzing large datasets has become a common activity in many industrial fields. Generally, datasets are acquired from internal and/or external sources as quantitative data, which can be used in statistical analyses to support accurate and timely business decisions. In some cases, a dataset is too large to visualize and analyze each data point individually. In such cases, users can cluster the data, thus simplifying the analysis and the visualization of the entire dataset.

Complex datasets, including spatial and temporal variant data, cannot always be clustered according to a fixed rule. When processing complex datasets histograms can be applied to analyze data distribution and to identify existing clusters. Therefore, using an interactive visualization tool based on histograms can support users in identifying clusters and outliers in large and complex datasets.

SUMMARY

Implementations of the present disclosure include computer-implemented methods for modifying a data visualization. In some implementations, methods include actions of receiving data, displaying the data visualization based on the data, the data visualization being displayed within a GUI and being provided as a histogram including a first plurality of bins, the first plurality of bins being defined based on default binning parameters, receiving user input, the user input being input to the data visualization using the GUI and indicating a first operation, providing user-defined binning based on the user input, and displaying a modified data visualization based on the data and the first operation, the modified data visualization being displayed within the GUI and being provided as a histogram including a second plurality of bins, the second plurality of bins being defined based on the user-defined binning parameters and being different from the first plurality of bins.

In some implementations, the first operation includes a merge operation, and a bin of the second plurality of bins is provided based on a plurality of bins of the first plurality of bins.

In some implementations, the first operation includes a split operation, and a plurality of bins of the second plurality of bins is provided based on a single bin of the first plurality of bins.

In some implementations, the first operation includes a filter operation, and a bin of the first plurality of bins is not included in the second plurality of bins.

In some implementations, the first operation includes a filter operation, and at least one bin of the second plurality of bins excludes a portion of the data.

In some implementations, the user input is received through a graphical menu that is displayed with the data visualization.

In some implementations, the user input includes a drag-and-drop associated with one or more bins of the first plurality of bins.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to modifying a graphical representation of a data visualization to enhance data analysis. More specifically, implementations provide for displaying a data visualization as a histogram including a first plurality of bins a graphical user interface (GUI), and enabling a user to directly interact with the data visualization within the GUI. In some examples, the user can be a data analyst (e.g., a supply chain manager, an enterprise resource planning manager, a business intelligence manager). In some implementations, the data visualization is provided as a histogram based on default binning parameters. In some implementations, the user can perform one or more actions to define binning parameters by providing user input to the data visualization using the GUI. In some implementations, the user is able to select actions for modifying binning parameters for the entire dataset or a part of the dataset. In some examples, the GUI displays a modified data visualization as a histogram including a second plurality of bins.

Figure 1:
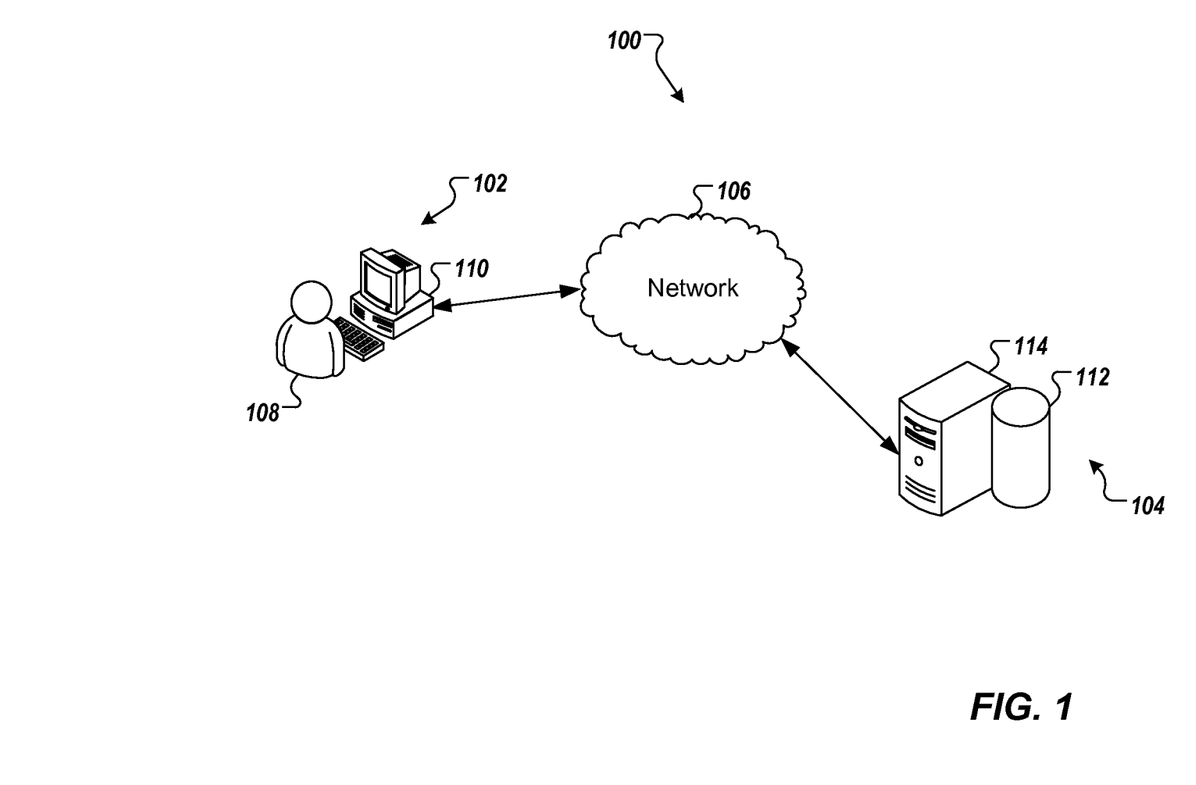
FIG. 1 depicts an example system that can be used to execute implementations of the present disclosure.

FIG. 1 depicts an example system 100 that can be used to execute implementations of the present disclosure. The example system 100 includes a user workstation 102, a server system 104 and a network 106. In the depicted example, a user 108 interacts with the user workstation 102. In an example context, the user 108 can include a data analyst of a company or a department of a company (e.g., warehouse).

In the depicted example, the user workstation 102 includes a computing device 110. In some examples, the computing device 110 can communicate with the server system 104 over the network 106. In some examples, the computing device 110 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EG-PRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes a server 112 and a data store 114. In the example of FIG. 1, the server system 104 is intended to represent various forms of servers including, but not limited to a web server, an application server, a proxy server, a network server, and/or a server pool. In general, the server system 104 accepts user requests for application services and provides such services to any number of client devices (e.g., the computing device 110) over the network 106. In some implementations, the server system 104 can provide a central point through which service-providers can manage and access data related to web services.

In accordance with implementations of the present disclosure, a data visualization can be generated as a histogram and can be displayed to the user 108 on the computing device 110. In some examples, data is stored in the server system 104 and is accessed for generation of the data visualization. In some examples, the computing device 110 executes data visualization software that retrieves data from the server system 104 and generates the data visualization. In some examples, the server system 104 executes data visualization software that retrieves data from the server system 104 and generates instructions that are provided to the computing device 110 to display the data visualization (e.g., the data visualization software is server-based and the computing device 110 functions as a client computing device). As discussed in further detail herein, the user 108 is able to directly interact with the data visualization to provide a modified data visualization.

In some implementations, software can be stored in memory of each of the computing devices to provide instructions to a processor (not shown) to perform various functions in accordance with implementations of the present disclosure. For example, the computing device 110 can store and execute software, such as an operating system and/or application programs. Implementations of the present disclosure can also include computer executable instructions, such as program modules executable by a computing device. In some examples, program modules can be defined as routines, programs, objects, components and/or data structures that perform particular tasks and/or that implement particular abstract data types.

Implementations of the present disclosure are discussed in further detail below with reference to an example context. The example context is directed to the analysis of a warehouse data, and more particularly to data visualization provided as histograms. The example context includes a procurements and acquisition manager (e.g., the user 108), who is responsible for ensuring supply continuity in the warehouse. Example modification of binning parameters can relate to simplification of large and complex datasets visualized as histograms. It is appreciated, however, that implementations of the present disclosure are readily applicable in other contexts.

In the example context, a data visualization provided as a histogram is a graphical representation of a distribution of underlying data. In some examples, a histogram includes tabular frequencies depicted as adjacent rectangles over discrete intervals, otherwise referred to as bins. In some examples, each bin includes an area equal to the frequency of the observations in the interval. In some examples, the height of a bin can be equal to the frequency density of the interval. In some examples, the frequency density is provided as the frequency divided by the width of the interval. In some examples, a histogram can be normalized to depict relative frequencies (e.g., in %), where the normalized histogram reflects the proportion of data that fall into each of several categories with the total area of the bins equaling 1 (e.g., 100%). In some examples, the categories can be specified as consecutive, non-overlapping intervals of a variable, where the categories (intervals) are adjacent.

As discussed above with reference to FIG. 1, data visualization tools can be provided to generate and display data visualizations. An example data visualization tool is SAP Visual Intelligence provided by SAP AG of Walldorf, Germany. In some examples, such data visualization tools enable users to visualize a distribution of data as a bar chart histogram.

In some examples, the visualized data can include internally and/or externally retrieved data. In some examples, the data, which needs to be visualized on the device 110, can be retrieved over the network 106 from the server system 104 or from external databases. In some examples, data is automatically retrieved (e.g. at particular intervals) or randomly retrieved from one or more external sources and stored in data store 114. In some examples, the user 108 generates instructions to retrieve the data for visualization and analysis. In some examples, a user can include a private person, a service agency or a company.

With continued reference to FIG. 1, the user 108, visualizing and interacting with the histogram, can be a procurements and acquisition manager of a company, that is responsible for the analysis of the supply stored in one or more warehouses, shipping orders, supply in transit, and/or other relevant information or data relevant for the business. Consequently, the data analysis could require visualization of data binned per particular categories. For example, binning can be based on data type, on an occurrence time, on a source type and/or other binning parameters. In the example context, the underlying data can include shipping data and can include a plurality of shipping types. Example shipping types can include "overnight" delivery and "standard-ground" delivery.

In some examples, a default binning, retrieved over the network 106 from the data store 114, can be provided for generating the histogram. For example, the number of intervals can be user defined or computed using a particular relationship. An example relationship can be provided as K=ceiling(1+10 log(N)/3), where N is the number of items per particular category and K is the number of intervals (bins). In some examples, intervals can be defined as: [min, (min+h), ..., [min+(K−1)h], [min+K*h], [min+(K+1)h], ..., max].

Implementations of the present disclosure provide user-defined, visual binning of histograms. For example, the user 108 can customize the binning parameters by providing user input directly to the histogram displayed within the GUI. In some implementations, the user 108 can initiate execution of one or more operations to transform a first plurality of bins into a second plurality of bins. For example, the operations can include merging bins, splitting one or more bins, filtering data to/from one or more bins and/or other appropriate operations. In some examples, the operation of merging n adjacent bins can be selected by user input to the graphical representation of the histogram (e.g., right clicking on selected adjacent bins). As a consequence of the merge operation, the n adjacent bins can be merged into a single bin (e.g., a rectangular merge by adding the width or by adding the area of the selected bins). Consequently, a merge operation results in the formation of a bin within a second plurality of bins based on a plurality of bins of the first plurality of bins. In some examples, the operation of splitting an existing bin into n bins can be selected by user input to the graphical representation of the histogram (e.g., right clicking on a selected bin). As a consequence of the split operation, a single bin can be split into multiple bins (e.g., generating multiple bins with a total width or area equal to the original width or area). Consequently, a split operation results in the formation of a plurality of bins of the second plurality of bins, based on a single bin of the first plurality of bins. In some examples, the operation of filtering data can be performed by the user 108 to remove data from consideration in generation of the histogram (e.g., outliers). Consequently, after the filter operation, one or more bins of the first plurality of bins are not included in the second plurality of bins, and/or one or more bins of the first plurality of bins are modified within the second plurality of bins. In some implementations, the user 108 can repeat and/or undo operations, the histogram being automatically modified in response to each operation. The computing device 110 and/or server system 104 can process the modified binning parameters and generate the display on the computing device 110. The advantages of using interactive operations to define custom binning are related to the enhancement of visual analysis of data, for instance by data clusters.

In some implementations, components of the data visualization can include associated computer code that enables the components to receive and be responsive to user input. For example, the data visualization can be displayed as a histogram within a GUI provided as a web page. In some examples, the web page can include an underlying document (e.g., an HTML5 document) that includes computer-program code for displaying the histogram. In some examples, each bin of the histogram can be provided as a component and can include computer-program code associated therewith. The computer-program code (e.g., Javascript) can be executed in response to user input to a respective component (bin) and can provide actions responsive to the user input.

Figure 2:
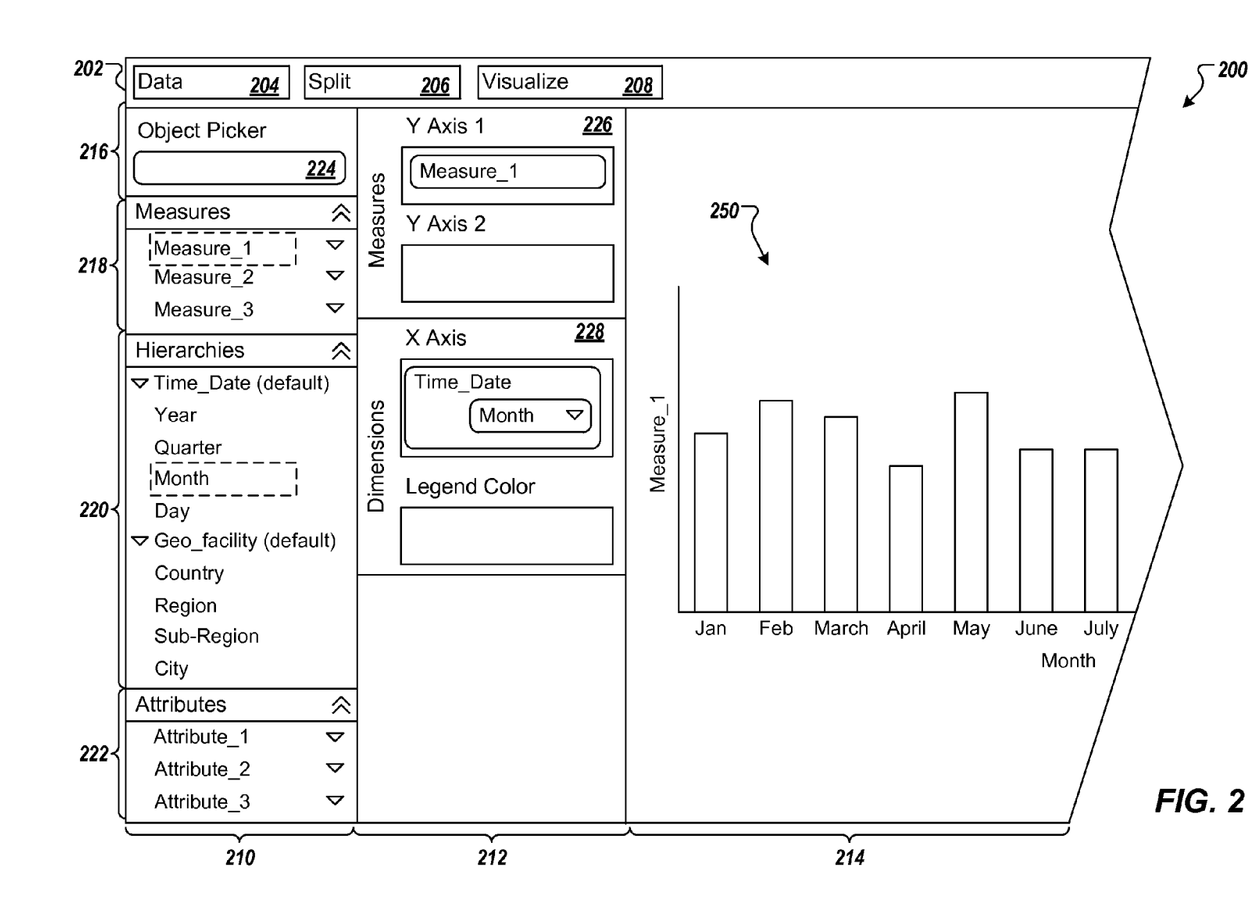
FIG. 2 depicts a portion of an example graphical user interface for displaying data visualizations.

FIG. 2 depicts a portion of an example graphical user interface (GUI) 200 for displaying data visualizations. In some implementations, the GUI 200 can be the interface displayed by the computing device 110, with which the user 108 is interacting, as described with reference to FIG. 1.

In the example of FIG. 2, the GUI 200 includes a number of choices presented in a menu bar 202, such as data 204, split 206 and visualize 208, an operations menu 210, a graphical menu 212 and a display section 214. In the present example, the visualize 208 choice has been selected by a user. The selection of data 204 causes the visualization application to connect to the database over the network to enable a user to see and to select a dataset from existent datasets stored in the database.

The operations menu 210 includes an object picker 216, a measures menu 218, a hierarchies menu 220 and an attributes menu 222, associated with the currently displayed data. In some examples, the object picker 216 includes a search box 224 that enables searching of data objects that can be used in data visualizations. In some examples, the measures menu 218 lists available data for data visualization. In some examples, the selection of a measure indicates its use as a Y axis of the histogram, as discussed in further detail herein. For example, the measure is selected by clicking on and dragging the measure to a measures box 226 of the graphical menu 212. In some implementations, multiple measures are chosen and can be displayed with differential markers (e.g., each measure could be defined by a particular color) in the display section 214.

In some implementations, the hierarchies menu 220 includes multiple categories, which can be used for creating the histogram (e.g. time, geo-facility, customer, delivery method). In some examples, the selection in the hierarchies menu 220 indicates its use as the X axis of the histogram. For example, the category is selected by clicking on and dragging the category to a dimensions box 228 of the graphical menu 212.

In the example of FIG. 2, the display section 214 includes the data visualization, such as a histogram 250 that is generated based on the underlying data (e.g., Measure_1). The histogram includes a plurality of bins. In some examples, an initial histogram 250 is generated based on default binning parameters and/or user-defined binning parameters. In some implementations, the X and Y axes of the histogram 250 can include additional information, such as labels associated with the bins (e.g., the names of the months) and quantitative values of the selected measure. In some examples (not illustrated in FIG. 2), the display section 214 also includes a legend, providing additional information about the dataset. For example, in the case where multiple measures are used to compose the histogram, the legend could indicate the color used for each of the measures. In some examples, the legend could indicate one or more of the most recent operations performed on the depicted histogram.

Figure 3A:
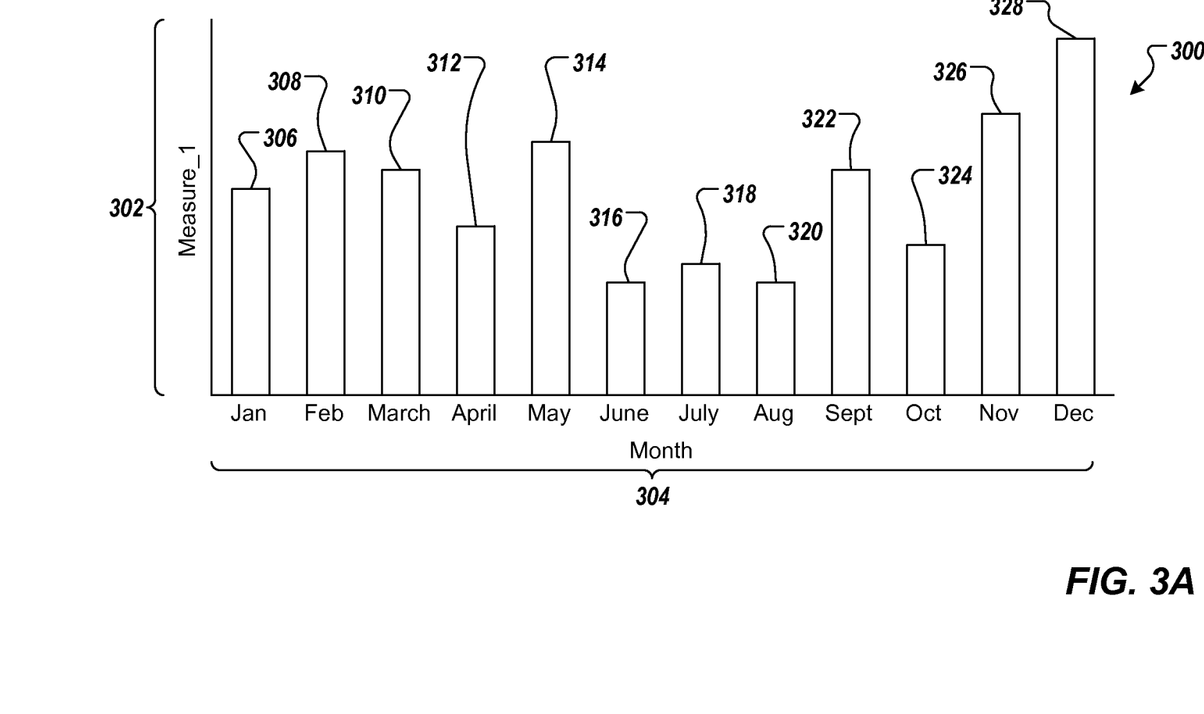
FIG. 3A depicts an example data visualization provided as a histogram.

FIG. 3A depicts an example data visualization 300 provided as a histogram. The example data visualization 300 includes a plurality of bins 306, 308, 310, 312, 314, 316, 316, 320, 322, 324, 326, 328 that are provided by processing underlying data (e.g., Measure_1) in view of default binning parameters. In some implementations, the axis labels indicate the binning parameters. In some implementations, the Y axis 302 represents by default the first dimension of the data received for visualization. In some implementations, the X axis 304 represents by default the temporal axis.

In the example context, the histogram (the data visualization 300) can be generated based on shipping data and each bin can reflect a number of shipments within a given interval (e.g., time period). In the depicted example, each bin can represent the shipping data clustered per month, covering an entire year. In some examples, the bins 306-328 reflect all shipping data regardless of shipping type (e.g., includes all "overnight" deliveries and "standard-ground" deliveries).

Figure 3B:
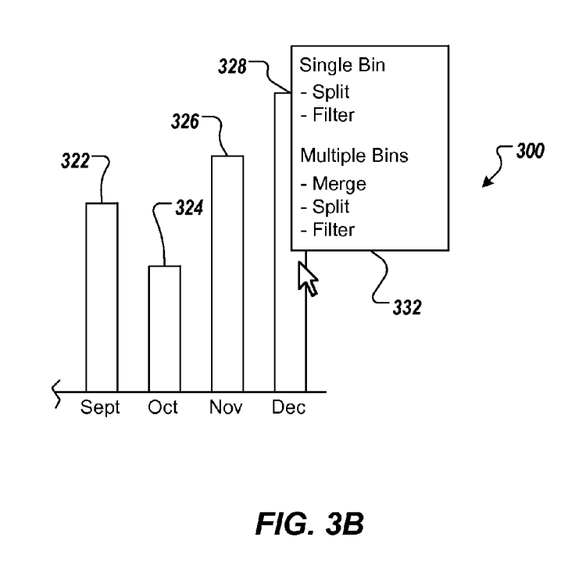
FIG. 3B depicts a portion of the example data visualization of FIG. 3A including an operations menu.

FIG. 3B depicts a portion of the example data visualization 300 of FIG. 3A including an operations menu 332. In some implementations, the user provides user input to a bin of interest (e.g., right clicking on the bin) to initiate display of the operations menu 332. The operations menu 332 can include a list of operations that can be performed on an individual bin and/or multiple bins. For example, as illustrated in FIG. 3B, operations that can be performed on a single bin can be split and filter. In some implementations, selecting an operation leads to the access of an additional function displayed in the GUI (e.g., the selection of filter operation can lead to the access of filter parameter menu to select a filter parameter that is to be applied). In some implementations, the operations for multiple bins are different from the operations available for single bins. For example, the operations for multiple bins can include merge, split and filter. In some implementations, selecting an operation for multiple bins leads to the access of an additional function displayed in the GUI for facilitating the selection of multiple bins. In some examples, instead of accessing the operations menu 332, a user can directly manipulate the bins (e.g., click on and drag one bin on top of another bin to merge the bins).

Figure 3C:
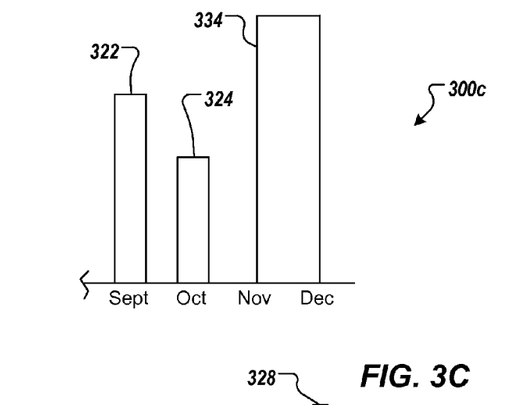
FIG. 3C depicts the portion of the example data visualization of FIG. 3B including modification based on an example operation.

FIG. 3C depicts the portion of the example data visualization of FIG. 3B including modification based on an example operation. This example operation includes merging multiple bins into a single bin (e.g., the bins 326, 328 to provide bin 334) to provide a modified histogram 300c. In some implementations, the histogram illustrates the operation selected by the user. In some implementations, the merged bin has an area that is equal to the total area of both of the underlying bins. In some implementations, the merged bin has a width that is equal to the total width of both of the underlying bins. In some implementations, the merged bin has a height that is equal to the total height of both of the underlying bins.

Figure 3D:
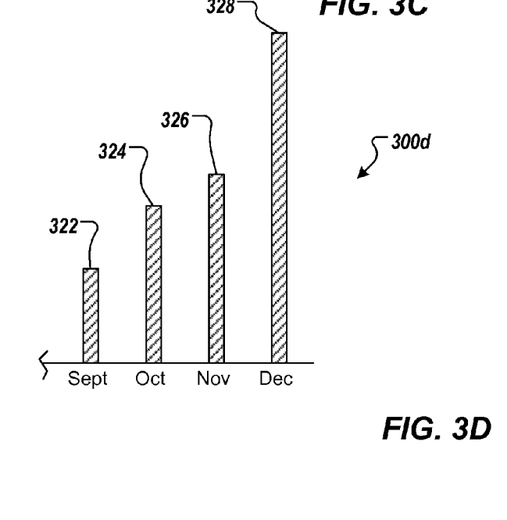
FIG. 3D depicts the portion of the example data visualization of FIG. 3B including modification based on an example operation.

FIG. 3D depicts the portion of the example data visualization of FIG. 3B including modification based on an example operation. This example operation includes filtering data from use in generating multiple bins (e.g., the bins 322, 324, 326, 328) to provide a modified histogram 300d. Within the example context of warehouse data, the procurements and acquisition manager can filter the data to show "overnight" delivery data only by filtering out "standard-ground" delivery data. In some implementations, the histogram illustrates the percentage of the data affected by the filter operation (e.g. the filtered bins have a proportionally smaller width than the original bins).

Figure 3E:
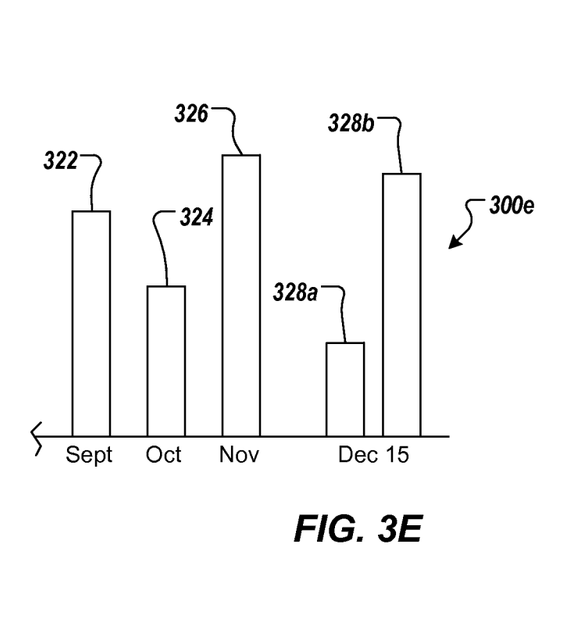
FIG. 3E depicts the portion of the example data visualization of FIG. 3B including modification based on an example operation.

FIG. 3E depicts the portion of the example data visualization of FIG. 3B including modification based on an example operation. This example operation includes splitting a single bin (e.g., the bin 328) into two or more bins (e.g., bins 328a, 328b) to provide a modified histogram 300e. In some implementations, the histogram illustrates the split operation selected by the user. In some implementations, the total area of split bins is equal to the area of the original bin. In some implementations, the total width of split bins is equal to the area of the original bin. In some implementations, the total height of split bins is equal to the area of the original bin.

Figure 3F:
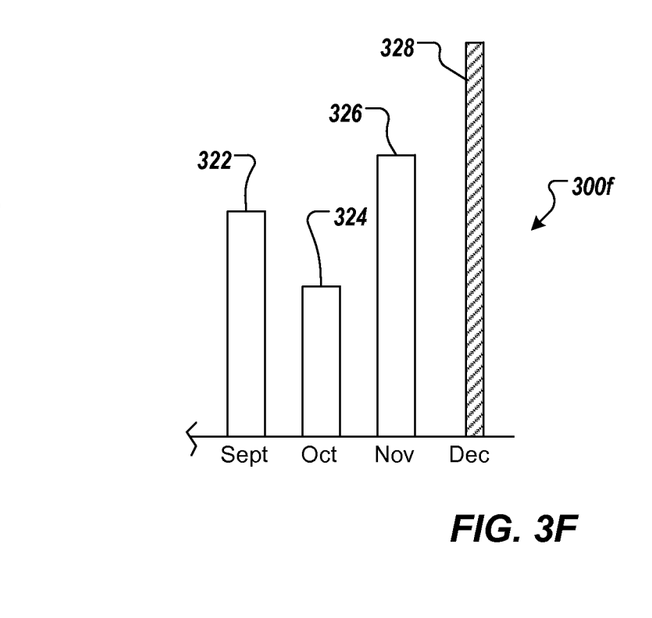
FIG. 3F depicts the portion of the example data visualization of FIG. 3B including modification based on an example operation.

FIG. 3F depicts the portion of the example data visualization of FIG. 3B including modification based on an example operation. This example operation includes filtering data underlying a single bin (e.g., the bin 328) to provide a modified histogram 300f. Within the example context of warehouse data, the procurements and acquisition manager can filter the data underlying the bin 328 to include only "overnight" delivery data, for example, by filtering out "standard-ground" delivery data. In some implementations, the histogram highlights the bins affected by the operation and illustrates the percentage of the data affected by the filter operation (e.g., the filtered bins have a proportionally smaller width than the original bins).

As discussed above, FIGS. 3C-3F depicts example operations that can be executed in response to user input to a displayed histogram. It is appreciated that the example operations of FIGS. 3C-3F are not exhaustive, and that implementations of the present disclosure can include other appropriate operations. For example, another example operations can include removing (e.g., filtering) a bin from a histogram to provide a modified histogram. In some examples, a bin can be representative of outlier data, and the bin can be removed to provide a visualization of a distribution of data without including the outlier data.

Figure 4:
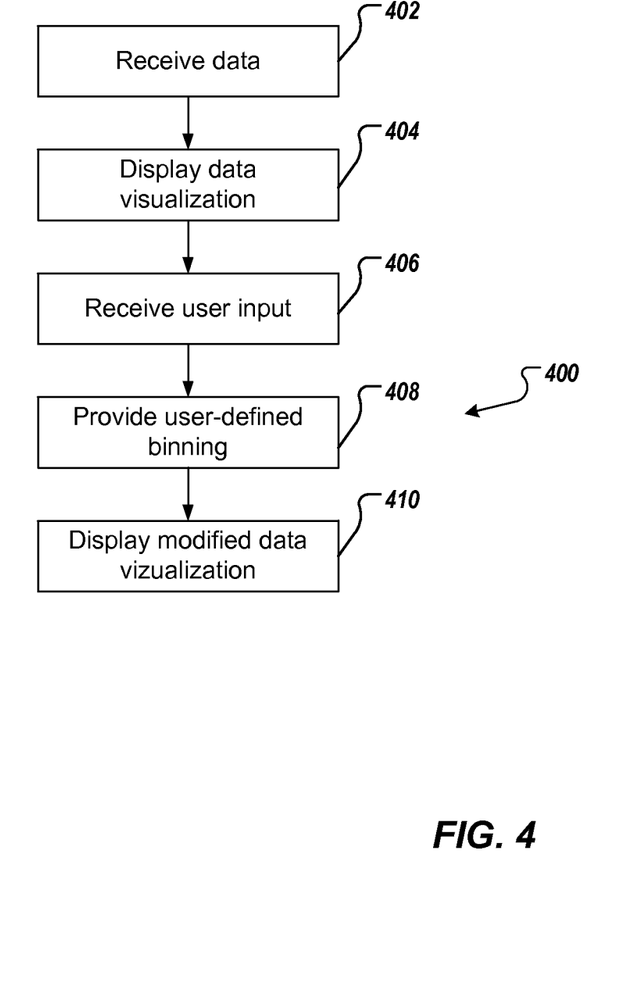
FIG. 4 depicts an example process that can be executed in accordance with implementations of the present disclosure.

FIG. 4 depicts an example process 400 that can be executed in accordance with implementations of the present disclosure. In some examples, the example process 400 can be provided using one or more computer-executable programs executed using one or more computing devices. The example process 400 can be used for data to be displayed to a user.

Data is received by one or more processors (e.g. computing device 110 in FIG. 1) (402). In some implementations, data is received in response to a user request. A data visualization is displayed based on the data (404). For example, the data visualization is displayed within a GUI (as illustrated in FIG. 2). The data visualization is displayed as a histogram including a first plurality of bins. The first plurality of bins can be defined based on default binning parameters.

The user can interact with the data visualization displayed within the GUI and can initiate execution of a first operation. In some implementations, the first operation includes one or more of a merge operation, a split operation and a filter operation. In some implementations, the first operation is initiated in response to user input provided directly to the data visualization (e.g., a right click, a drag and drop operation). The input of the user is received by the one or more processors (406). The processors can process the data based on the user input and provide a user-defined binning (408).

A modified data visualization based on the data and the first operation is displayed within the GUI (410). The modified data visualization is provided as a histogram including a second plurality of bins. For example, the second plurality of bins is defined based on the user-defined binning parameters and is different from the first plurality of bins.

Figure 5:
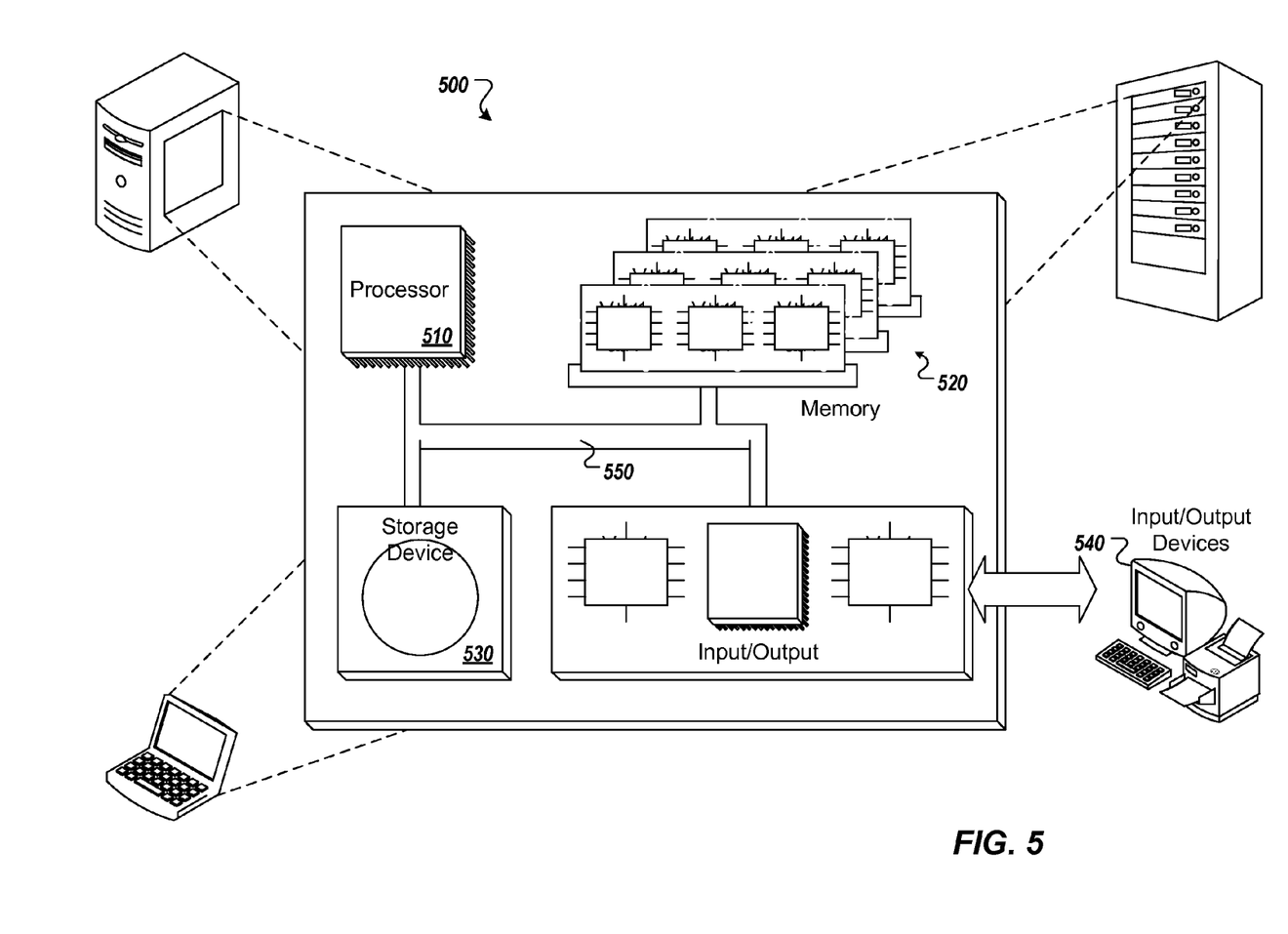
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for modifying a data visualization, the method being executed using one or more processors and comprising:

receiving, by the one or more processors, data;

displaying the data visualization based on the data, the data visualization being displayed within a graphical user interface (GUI) and being provided as a histogram comprising a first plurality of bins, the first plurality of bins being defined based on default binning parameters;

receiving, by the one or more processors, user input, the user input being input to the data visualization using the GUI by directly manipulating at least a single bin of the first plurality of bins and indicating a first operation comprising a first function to be performed on the single bin of the first plurality of bins and a second function to be performed on the first plurality of bins, the second function being different from the first function;

providing user-defined binning parameters based on the user input; and displaying a modified data visualization based on the data and the first operation, the modified data visualization being displayed within the GUI and being provided as the histogram comprising a second plurality of bins, the second plurality of bins being defined based on the user-defined binning parameters and being different from the first plurality of bins.

2. The method of claim 1, wherein the first operation comprises a merge operation, and a bin of the second plurality of bins is provided based on a plurality of bins of the first plurality of bins.

3. The method of claim 1, wherein the first operation comprises a split operation, and a plurality of bins of the second plurality of bins is provided based on a single bin of the first plurality of bins.

4. The method of claim 1, wherein the first operation comprises a filter operation, and a bin of the first plurality of bins is not included in the second plurality of bins.

5. The method of claim 1, wherein the first operation comprises a filter operation, and at least one bin of the second plurality of bins excludes a portion of the data.

6. The method of claim 1, wherein the user input is received through a graphical menu that is displayed with the data visualization.

7. The method of claim 1, wherein the user input comprises a drag-and-drop associated with one or more bins of the first plurality of bins.

8. A non-transitory computer-readable storage medium coupled to one or more processors and having instructions stored thereon which, when executed by the one or more processors, cause the one or more processors to perform operations for modifying a data visualization, the operations comprising:
- receiving data;
- displaying the data visualization based on the data, the data visualization being displayed within a graphical user interface (GUI) and being provided as a histogram comprising a first plurality of bins, the first plurality of bins being defined based on default binning parameters;
- receiving user input, the user input being input to the data visualization using the GUI by directly manipulating at least a single bin of the first plurality of bins and indicating a first operation comprising a first function to be performed on the single bin of the first plurality of bins and a second function to be performed on the first plurality of bins, the second function being different from the first function;
- providing user-defined binning parameters based on the user input; and
- displaying a modified data visualization based on the data and the first operation, the modified data visualization being displayed within the GUI and being provided as the histogram comprising a second plurality of bins, the second plurality of bins being defined based on the user-defined binning parameters and being different from the first plurality of bins.

9. The computer-readable storage medium of claim 8, wherein the first operation comprises a merge operation, and a bin of the second plurality of bins is provided based on a plurality of bins of the first plurality of bins.

10. The computer-readable storage medium of claim 8, wherein the first operation comprises a split operation, and a plurality of bins of the second plurality of bins is provided based on a single bin of the first plurality of bins.

11. The computer-readable storage medium of claim 8, wherein the first operation comprises a filter operation, and a bin of the first plurality of bins is not included in the second plurality of bins.

12. The computer-readable storage medium of claim 8, wherein the first operation comprises a filter operation, and at least one bin of the second plurality of bins excludes a portion of the data.

13. The computer-readable storage medium of claim 8, wherein the user input is received through a graphical menu that is displayed with the data visualization.

14. The computer-readable storage medium of claim 8, wherein the user input comprises a drag-and-drop associated with one or more bins of the first plurality of bins.

15. A system, comprising:
- a computing device; and
- a computer-readable storage device coupled to the computing device and having instructions stored thereon which, when executed by the computing device, cause the computing device to perform operations for modifying a data visualization, the operations comprising:
  - receiving data;
  - displaying the data visualization based on the data, the data visualization being displayed within a graphical user interface (GUI) and being provided as a histogram comprising a first plurality of bins, the first plurality of bins being defined based on default binning parameters;
  - receiving user input, the user input being input to the data visualization using the GUI by directly manipulating at least a single bin of the first plurality of bins and indicating a first operation comprising a first function to be performed on the single bin of the first plurality of bins and a second function to be performed on the first plurality of bins, the second function being different from the first function;
  - providing user-defined binning parameters based on the user input; and
  - displaying a modified data visualization based on the data and the first operation, the modified data visualization being displayed within the GUI and being provided as the histogram comprising a second plurality of bins, the second plurality of bins being defined based on the user-defined binning parameters and being different from the first plurality of bins.

16. The system of claim 15, wherein the first operation comprises a merge operation, and a bin of the second plurality of bins is provided based on a plurality of bins of the first plurality of bins.

17. The system of claim 15, wherein the first operation comprises a split operation, and a plurality of bins of the second plurality of bins is provided based on a single bin of the first plurality of bins.

18. The system of claim 15, wherein the first operation comprises a filter operation, and a bin of the first plurality of bins is not included in the second plurality of bins.

19. The system of claim 15, wherein the first operation comprises a filter operation, and at least one bin of the second plurality of bins excludes a portion of the data.

20. The system of claim 15, wherein the user input comprises a drag-and-drop associated with one or more bins of the first plurality of bins.

* * * * *